April 3, 1951
L. D. SMART
2,547,289
OSCILLOGRAPH
Filed Nov. 28, 1945
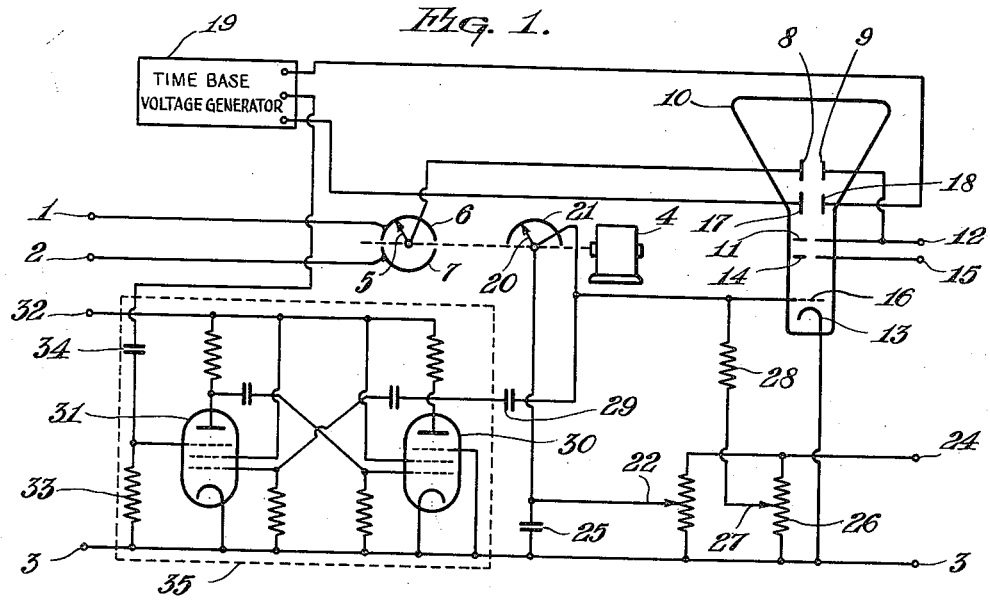
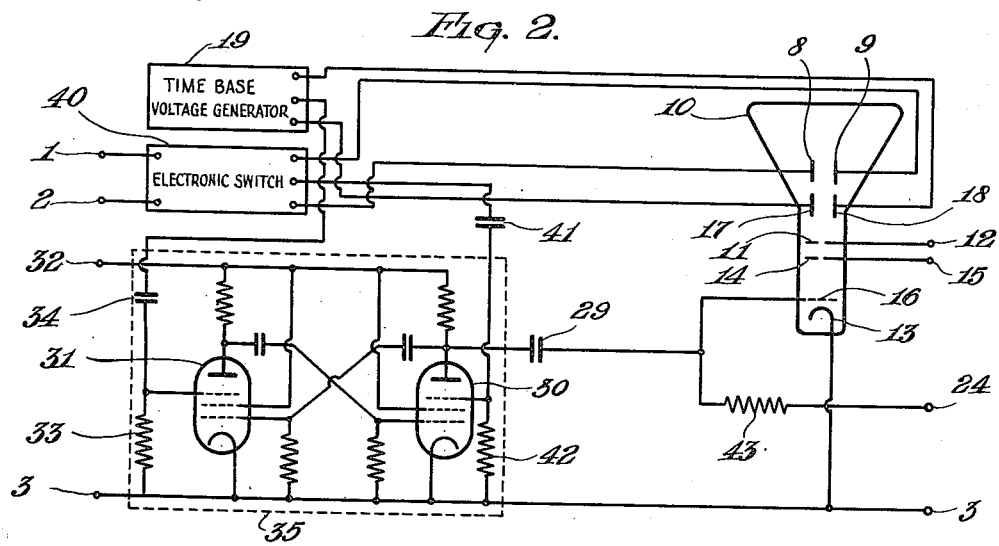
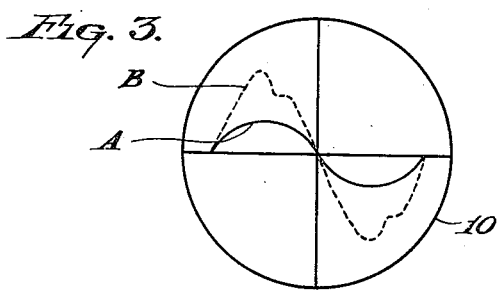
LESLIE DOUGLAS SMART.
INVENTOR.
BY
ATTORNEY.

Patented Apr. 3, 1951

2,547,289

UNITED STATES PATENT OFFICE 2,547,289

OSCILLOGRAPH

Leslie D. Smart, Bournemouth, England, assignor to The Hartford National Bank & Trust Company, Hartford, Conn., trustee Application November 28, 1945, Serial No. 631,382
In Great Britain September 19, 1944

Section 1, Public Law 690, August 8, 1946
Patent expires September 19, 1964

6 Claims. (Cl. 315—22)

The present invention relates to oscillographs in which at least two traces are produced on a screen. Such oscillographs may be used for the examination and/or recording of two or more separate types of waveform, where each waveform is shown by one of the said traces. With this application a difficulty arises in that it is not always obvious which of the traces represents a given waveform.

According to the present invention, in an oscillograph adapted to produce two or more traces on a screen, means are provided whereby the intensity of at least one of the said traces may be varied periodically along the trace, whereby the traces may be distinguished one from another.

Preferably the frequency of variation of the intensity along the trace is high, compared with the trace repetition frequency, and the said intensity varies from substantially zero to a given level, so that a series of visible dots or other symbols is apparent. If more than two traces are used the periodical variation of intensity may be different for each of the traces which have to be given distinguishing characteristics. For example one trace may consist of dots, and another of dashes separated by dots or dashes. Other distinguishing characteristics of this type may obviously be used.

The invention is particularly applicable to cathode ray oscillographs having a grid electrode which can control the intensity of the beam of cathode-rays. One method of viewing two or more waveforms simultaneously on the fluorescent or other screen of the said oscillograph comprises a first switch for connecting the sources of the said waveforms in sequence to a deflection system of the oscillograph producing a deflection in one direction. The other deflection system of the oscillograph, operating in general at right angles to the first mentioned deflection system, is supplied as usual with appropriate electrical quantities from a time base circuit. The frequency of operation of this first switch is generally made either considerably greater than or a fraction of the frequency of the waveforms to be examined. In the latter case the said fraction is chosen such that complete cycles of these waveforms can be defined clearly on the screen. In both cases the time base frequency should be synchronised to the waveform frequency in known manner. The switch may be mechanical or electrical and in the latter case may include amplification means for the waveforms to be examined, such a device when including thermionic discharge tubes being customarily referred to as an "electronic switch." The present invention is of particular value for identifying the waveform traces produced on a cathode ray tube screen with the aid of an electronic switch. The two or more waveforms which may then be viewed on the screen may be distinguished from one another according to a particular feature of this invention by arranging that a second switch operating in synchronism with the first switch causes the grid of the cathode ray tube to be joined successively to sources of different types of periodic voltage so that as each of the waveforms under observation is switched in sequence to the deflection system as referred to above, the grid of the cathode ray tube receives voltages from one of the different periodic voltage sources. One of the said sources of periodic voltage may be replaced by a steady voltage of finite or zero value so that one of the waveform traces is of substantially constant intensity of illumination except for variations resulting from its own deviations over the screen.

In a cathode ray tube with grid electrode, the effect of the periodic voltages applied to this grid electrode on the waveform traces produced on the fluorescent or other screen is to cause corresponding periodic changes of the intensity along the said traces and in order that these periodic changes of intensity may give rise to a stationary or synchronised image on the said screen, the time required to show on the fluorescent screen one complete trace of all the waveforms under examination must be an integral multiple of the periodic time of any of the said periodic voltages. Preferably the values of these voltages are such as to periodically reduce the intensity of a trace to zero so that a number of bright dots or dashes separated by dark spaces appear on the screen. The said periodic voltages may with advantage be of rectangular or square waveform so as to give sharpness to the dots or dashes.

The present invention has been found to be of particular value when incorporated in an apparatus such as that described by A. J. Heins van der Ven in Philips Technical Review, March 1940, pages 61–68. In Fig. 6 of this article is shown a reproduction of a photograph of superposed characteristic curves of two thermionic valves obtained with a cathode ray oscillograph by means of a switch connecting the said values in sequence to the vertical deflecting system of the said oscillograph. The characteristic curves contain what appear to be a relatively large number of traces which however may be reduced basically to sequences of two main traces, one representing each valve. Subsidiary traces which need not be considered here produce co-ordinate axes. In order that these two main traces might be distinguished one from the other in this prior apparatus, one of the traces was arranged to be less bright than the other by suitably biasing the grid of the cathode tube in the oscillograph during one of the main traces, but this method of distinction was not altogether suitable, especially when photographic reproduction was to be considered. With the present invention instead of arranging for one of the two main traces to be less bright than the other, this trace is arranged to appear as a series of bright dots preferably of the same peak intensity of illumination as the other trace.

Two embodiments of the invention will now be described by way of example with reference to the accompanying drawings in which:

Fig. 1 shows the use of a mechanical switch for examining two waveforms, and

Fig. 2 shows an alternative arrangement using an electronic switch.

In both these arrangemnts, use is made of a rectangular system of deflection, but the invention is not limited thereto and is equally applicable to radial or spiral systems of deflection.

In Fig. 1, the terminals 1, 3 and 2, 3 receive voltages corresponding to two waveforms to be examined, terminal 3 being at zero potential. A motor 4 rotates a commutator arm 5 which wipes semi-circular segment 6 and 7, the latter being connected respectively to the terminals 1 and 2, so that the voltages existing across the terminals 1, 3 and 2, 3 respectively are applied in alternation to the arm 5. The arm 5 is connected to the deflector plate 8 of a cathode ray tube 10. The deflector plate 9 complementary to the deflector plate 8 is connected to the second anode 11 of the cathode ray tube. This anode is supplied at a terminal 12 with a suitably high positive potential with respect to the cathode 13 which is connected to the zero potential line joined to the terminal 3. The cathode ray tube also has a first anode 14 supplied with a suitable positive potential at a terminal 15, a grid electrode 16 and a second pair of deflector plates 17, 18. The plates 17, 18 are supplied with sawtooth or other suitable potentials from a time base represented block schematically by 19. The time base 19 is synchronised by a suitable connection (not shown) to the waveforms to be examined in the usual manner, so that a steady picture is obtained on the fluorescent screen of the cathode ray tube. Generally it will be advantageous for the revolution frequency of the commutator arm 5 to have a fixed relation to the waveform frequency, and in some applications, e. g. tracing thermionic valve characteristics, this revolution frequency will be fundamental to the frequency of the waveforms to be examined and the time base frequency.

With the arrangement so far described, the two waveforms to be examined will appear together on the fluorescent screen of the cathode ray tube (assuming for the moment that the grid 16 is supplied with a suitable fixed bias voltage). One waveform will depend on the voltage applied to the terminals 1 and 3 and the other will depend on the voltage applied to the terminals 2 and 3 but it will not always be obvious which waveform originates from a given one of the voltages. In order that a distinction may be obtained, one of the waveforms is "dotted" by applying a rectangular waveform to the grid of the cathode ray tube during the periods when this waveform is being produced. To accomplish this a second commutator arm 20 fixed to the same shaft as the commutator arm 5 wipes a single semi-circular segment 21 during one half of a revolution, but is on open circuit during the other half revolution. The arms 5 and 20 are arranged to commence wiping the segments 6 and 21 respectively, at the same instant. The segment 21 is connected to the grid 16 while the arm 20 is connected to the slider 22 of a potentiometer 23 connected between the terminal 3 and a terminal 24, the latter being supplied with a negative voltage with respect to the terminal 3. A condenser 25 ensures that the voltage between the slider 22 and the terminal 3 is steady. When the arm 6 is wiping the segment 21, the grid 16 will be at a steady negative potential with respect to the cathode 13 and by adjustment of this potential by means of the slider 22 the waveform produced by the voltage applied to the terminals 1 and 3 can be viewed at a desired level of brightness and will consist of a continuous trace. During the half revolution when the arm 20 is not wiping the segment 21, the grid 16 is free to take up a steady potential provided by a second potentiometer 26 connected across the potentiometer 23 by way of a slider 27 and a resistance 28, and an alternating potential of rectangular waveform obtained by way of a condenser 29 from a multivibrator circuit 35. The resistance 28 is preferably of high value compared with the resistance of the potentiometer 23, so that when the arm 20 wipes the segment 21 the potential of the grid 16 is determined almost entirely by the setting of the slider 22 and during this period is substantially unaffected by the setting of the slider 27.

The multivibrator circuit 35 is conventional except that it uses pentode valves 30, 31 with anodes and control grids cross connected in the usual way, the screen grids being at a fixed positive potential obtained from a terminal 32 which also supplies the anodes by way of their load resistances. The terminal 3 provides zero potential for the multivibrator circuit. The suppressor grid of the valve 30 is joined effectively to the cathode of the valve but the suppressor grid of the valve 31 is provided by means of a resistance 33 and a condenser 34 with a synchronising voltage obtained from the time base 19. The multivibrator circuit is adjusted to give a waveform repetition frequency considerably higher than, and by virtue of the synchronising circuit, a multiple of, the time base frequency.

The anode of the valve 30 is connected to the condenser 29 by which is applied to the cathode ray tube grid 16 the voltage of rectangular waveform generated by the multivibrator. The combined effect of this voltage and the steady voltage supplied by the resistance 28 can be arranged by adjustment of the slider 27 to cause the waveform produced on the fluorescent screen corresponding to the voltage applied to the terminals 2, 3 to be composed of a series of bright dots superposed on a darker trace, the latter being "blacked out" completely if desired. By suitable adjustment of the multivibrator circuit in known manner, it can be arranged to yield rectangular waveforms of varying type ranging from short pulses spaced by long intervals, to a square waveform, by means of which a variety of identification "dots" may be imparted to one of the waveforms under examination.

In Fig. 2, elements which correspond identically as regards their function to similar elements in Fig. 1, are identified by the same numerals and will not be further described. In Fig. 2, the two voltages whose waveforms are to be examined are applied by way of the terminals 1 and 2 to an electronic switch denoted block schematically by 40 which performs a similar function to the mechanical commutator described with reference to Fig. 1. The circuit details and mode of operation of the electronic switch are well-known and have already been described, for example, in Philips Technical Review, September 1939, pages 267–271. The electronic switch is connected to the two deflector plates 8 and 9 to apply push-pull deflection voltages. Two waveforms are produced on the fluorescent screen of the cathode-ray tube and in order that they shall be distinguishable a multivibrator circuit 35 is used to "dot" one of the waveform traces. The electron switch in operation produces a voltage of square waveform which is used to alternately "switch" thermionic valves so as to transmit alternately the voltages between the terminals 1, 3 and 2, 3 respectively. The multivibrator 35 is arranged to operate only while one of the last mentioned voltages is being transmitted by applying the square wave voltage generated in the electronic switch by way of a condenser 41 and a resistance 42 to the suppressor grid of the valve 30 so that during the negative half of the square wave, the valve 30 is blocked, and the multivibrator is inoperative. During each negative half of the square wave, therefore, the grid 16 of the cathode ray tube is not supplied with any alternating voltage from the multivibrator but only a steady negative voltage, supplied by way of a resistance 43 from the terminal 24 which is connected to a suitable supply. The waveform which is produced during the intervals while the multivibrator is inoperative will therefore consist (apart from effects due to the mode of operation of the electronic switch) of a continuous trace. During positive half-wave intervals of the square wave produced by the electron switch, the multivibrator be allowed to operate and will transfer to the grid 16 by way of the condenser 29 the pulses of rectangular waveform generated by it which will "dot" the waveform which is produced during these intervals. The time base 19 is synchronised in the usual manner to the voltages applied to terminals 1, 3 and 2, 3 respectively, but the connections are not shown. The multivibrator 35 is synchronised to the time base 19 as already described with reference to Fig. 1.

With the arrangements described with reference to Figs. 1 and 2 one of the two waveforms to be examined appears on the fluorescent screen of the cathode ray tube as a continuous trace while the other appears as a "dotted" trace so that identification becomes a simple matter after determining initially which of the sets of terminals 1, 3 and 2, 3 is to be associated with the dotted trace.

Specially constructed cathode ray oscillographs are known in which multiple traces may be produced by having multiple deflection systems operating independently on multiple electron beams in one direction. Usually a common deflection system operates in the other direction. A rectangular co-ordinate system is assumed to be required. If the multiple electron beams are controlled individually by separate grids the traces may be distinguished by operating on each grid in the manner described above. If a common grid controls all the traces it is not possible to distinguish the various traces by such means and in this case the periodic changes of intensity along the different traces may be achieved by arranging that each of the electron beams to have distinguishing characteristics applied to it is given a considerable deflection periodically, preferably off the viewing screen, the deflection occurring so rapidly as to give no visible trace of the deflection on the screen. The necessary conditions as to the synchronism of these deflections remain as hereinbefore described.

If an oscillograph of the Duddell type is used in which multiple traces are produced by having multiple elements deflecting multiple light beams, distinguishing characteristics may be imparted to the various light beams by periodically interrupting in any known manner those beams to be distinguished so as to result in periodic changes in intensity along the corresponding traces produced. A rotating shutter can be used for this purpose provided the condition as to synchronism of the rate of interruption with the rate of trace repetition is observed.

I claim:

1. Oscillographic apparatus for simultaneously exhibiting on a screen the respective wave forms of at least two wave sources whose wave forms are unknown comprising means repeatedly to produce on the screen traces each representing the wave form of a respective wave source, the traces being produced in superposed relation and means for varying the intensity of at least one of the traces periodically along the trace path whereby the traces are distinguished one from the other.

2. Oscillographic apparatus for simultaneously exhibiting on a screen the respective wave forms of at least two wave sources whose wave forms are unknown comprising means repeatedly to produce on the screen traces each representing the wave form of a respective wave source, the repetition frequency of each trace being an integral submultiple of the frequency of the wave source, the traces being produced in superposed relation and means for varying the intensity of at least one of the traces periodically along the trace path whereby the traces are distinguished one from the other.

3. Oscillographic apparatus for simultaneously exhibiting on a screen the respective wave forms of at least two wave sources whose wave forms are unknown comprising means repeatedly to produce on the screen traces each representing the wave form of a respective wave source, the repetition frequency of each trace being an integral submultiple of the frequency of the wave source, the traces being produced in superposed relation and means for varying the intensity of at least one of the traces periodically along the trace path whereby the traces are distinguished one from the other, the frequency of variation of intensity being high relative to the trace repetition frequency.

4. Oscillographic apparatus for simultaneously exhibiting on a screen the respective wave forms of at least two wave sources whose wave forms are unknown comprising means repeatedly to produce on the screen traces each representing the wave form of a respective wave source, the repetition frequency of each trace being an integral submultiple of the frequency of the wave source, the traces being produced in superposed relation and means for varying the intensity of at least one of the trace periodically between zero intensity and a predetermined value so that the trace is discontinuous and assumes the form of a series of dots, the frequency of variation of intensity being high relative to the trace repetition frequency.

5. Oscillographic apparatus for exhibiting on a screen the respective wave forms of first and second wave sources whose wave forms are unknown comprising a cathode-ray beam tube including two sets of opposing deflection means and an intensity control electrode, a time base generator adapted to produce a first sawtooth voltage whose frequency is an integral submultiple of the frequency of the first wave source and a second sawtooth voltage whose frequency is an integral submultiple of the frequency of the second wave source, means to generate a beam intensity modulation voltage, and switching means for alternately in a first condition applying the output of said first wave source to one set of said deflection means and simultaneously applying said first sawtooth wave to the other set of said deflection means and in a second condition applying the output of said second wave source to said one set of said deflection means and simultaneously applying said second saw-tooth voltage to said other set of said deflection means and simultaneously applying said modulation voltage to said intensity control electrode.

6. Oscillographic apparatus for exhibiting on a screen the respective wave forms of first and second wave source comprising a cathode-ray beam tube including two sets of opposing deflection means and an intensity control electrode, a time base generator adapted to produce a first sawtooth voltage whose frequency is an integral submultiple of the frequency of the first wave source and a second sawtooth voltage whose frequency is an integral submultiple of the frequency of the second wave source, a multivibrator for generating a rectangular voltage whose frequency is high relative to said second sawtooth voltage, and switching means for alternately in a first condition applying the output of said first wave source to one set of said deflection means and simultaneously applying said first sawtooth voltage to the other set of said deflection means, and in a second condition applying the output of said second wave source to said one set of deflection means and simultaneously applying said second sawtooth voltage to said other set of said deflection means and simultaneously applying said rectangular voltage to said intensity control electrode.

LESLIE D. SMART.

REFERENCES CITED

The following references are of record in the file of this patent:

UNITED STATES PATENTS

| Number | Name | Date |
|---|---|---|
| 2,122,499 | Stocker | July 5, 1938 |
| 2,280,531 | Norgaard | Apr. 21, 1942 |
| 2,300,999 | Williams | Nov. 3, 1942 |
| 2,345,932 | Gould | Apr. 4, 1944 |
| 2,405,238 | Seeley | Aug. 6, 1946 |
| 2,416,290 | Depp | Feb. 25, 1947 |
| 2,431,324 | Grieg | Nov. 25, 1947 |
| 2,432,196 | Hershberger | Dec. 9, 1947 |
| 2,477,615 | Isbister | Aug. 2, 1949 |
| 2,477,770 | Richter | Aug. 2, 1949 |